(12) United States Patent
Poulet et al.

(10) Patent No.: US 12,140,045 B2
(45) Date of Patent: Nov. 12, 2024

(54) METHOD FOR BALANCING FAN VANES WITH TRAILING EDGE MACHINING

(71) Applicant: SAFRAN AIRCRAFT ENGINES, Paris (FR)

(72) Inventors: Pierre-Alexis Poulet, Moissy-Cramayel (FR); Richard Mounien, Moissy-Cramayel (FR); Lucas Antoine Christophe Lauwick, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/571,688

(22) PCT Filed: Jun. 16, 2022

(86) PCT No.: PCT/FR2022/051175
§ 371 (c)(1),
(2) Date: Dec. 18, 2023

(87) PCT Pub. No.: WO2022/269173
PCT Pub. Date: Dec. 29, 2022

(65) Prior Publication Data
US 2024/0287909 A1 Aug. 29, 2024

(30) Foreign Application Priority Data
Jun. 21, 2021 (FR) ........................................ 2106571

(51) Int. Cl.
*F01D 5/28* (2006.01)
(52) U.S. Cl.
CPC .......... *F01D 5/282* (2013.01); *F05D 2230/10* (2013.01); *F05D 2240/303* (2013.01); *F05D 2240/304* (2013.01)

(58) Field of Classification Search
CPC .............................. F01D 5/282; F05D 2230/10
See application file for complete search history.

(56) References Cited

U.S. PATENT DOCUMENTS

| | | | | |
|---|---|---|---|---|
| 5,269,057 A * | 12/1993 | Mendham | ............... | F01D 5/005 29/402.13 |
| 9,011,205 B2 * | 4/2015 | Bewlay | ..................... | B24C 1/04 451/36 |
| 2020/0032660 A1 * | 1/2020 | Stilin | ..................... | B32B 15/08 |

FOREIGN PATENT DOCUMENTS

| DE | 102007045300 A1 | 4/2009 |
|---|---|---|
| EP | 1884624 A2 | 2/2008 |

(Continued)

OTHER PUBLICATIONS

International Search Report for PCT Patent Application No. PCT/FR2022/051175, mailed on Oct. 7, 2022, 8 pages.

*Primary Examiner* — Michael L Sehn
(74) *Attorney, Agent, or Firm* — WOMBLE BOND DICKINSON (US) LLP

(57) ABSTRACT

A method for manufacturing a blade of a fan for an aircraft turbomachine extending around a longitudinal axis, the blade including an aerofoil made of a composite material having a leading edge and a trailing edge connected by a pressure side and a suction side, the aerofoil extending between a base and a free end, the method including each of the following steps: —pairing and bonding a metal shield to the leading edge, —obtaining a first measurement of a radial moment weight of the blade before or after the metal shield has been bonded to the leading edge and determining a machining kerf, —machining the free end and/or the trailing edge along the machining kerf so as to adjust the mass and radial moment weight of the blade, —obtaining a second measurement of the radial moment weight of the blade.

9 Claims, 1 Drawing Sheet

(56) References Cited

FOREIGN PATENT DOCUMENTS

EP 3663516 A1 6/2020
GB 2224784 A 5/1990

* cited by examiner

METHOD FOR BALANCING FAN VANES WITH TRAILING EDGE MACHINING

FIELD OF THE INVENTION

The present invention relates to the manufacture of turbomachine fan vanes.

BACKGROUND

The prior art is illustrated by the documents GB-A-2 224 784, EP-A2-1 884 624, EP-A1-3 663 516, DE-A1-10 2007 045 300.

In a conventional manner known per se, a turbomachine fan has a central disc rotating about an axis of rotation passing substantially through its centre. A plurality of vanes are mounted on the central disc, evenly distributed around its circumference. To achieve this, the central disc has a series of slots around its periphery, and each vane comprises a corresponding root. In this way, each vane can be fitted into the corresponding slot in the central disc and be retained at the periphery of the latter using mechanisms known in the prior art.

Each vane comprises a blade with a leading edge, a trailing edge, a pressure side and a suction side. The blade is typically made of composite material. To protect the leading edge, it is known to arrange a metal shield on the leading edge.

Each vane is mounted on the central disc according to its own inertia and its relative inertia with respect to the neighbouring vanes. This meticulous assembly is referred to as "balancing".

Traditionally, two main concepts are used to balance the fan: the mass and the radial moment weight (RMW) of each vane.

Balancing a rotor is essential to prevent rotation inducing a force perpendicular to the axis of rotation and prematurely wearing out the rotor, for better efficiency and optimum performance.

The measurement of the mass simply consists of measuring the mass of each vane, so that they can be adjusted on the central disc to balance the loads around the disc and minimise the potential imbalances. However, this adjustment of the vanes in pairs is not enough. Or rather, it is sufficient if the centre of gravity of each vane is located at an equal distance from the centre of the central disc. To balance the rotor, the forces generated by the vanes must be balanced relative to the axis of rotation of the disc. The force generated by a vane is referred to as the "radial moment weight" of the vane. The radial moment weight of a vane is equal to the mass of the vane multiplied by the distance between the centre of gravity of the vane and the axis of rotation of the disc. When the radial moment weight of each vane is equal to that of the others, the rotor is perfectly balanced. As every person skilled in the art knows, the service life of a rotor depends in part on how well it is balanced: the better balanced the rotor, the less quickly it wears out.

Thus, as is well known, the radial moment weight of the vanes is a critical parameter in issues relating to the service life of the rotor. The aim is therefore to homogenise the radial moment weight of the vanes as much as possible in order to keep dispersion to a minimum.

The current manufacturing methods for manufacturing vanes comprise a pairing step followed by bonding of the metal shield to the leading edge. The combination of the vane and the metal shield is referred to as pairing. The free end of the vane is then machined. The vane is then finished (by adding paint, etc.). The radial moment weight of each vane is then measured.

The fan is then assembled. To this end, the vanes are mounted on the central disc. In order to optimise the balancing of the fan, the assembly method comprises a preliminary step to determine the best distribution of the vanes on the fan disc. The optimum repair of the vanes on the disc is determined using an algorithmic tool that selects the vanes and calculates their best distribution on the complete fan, on the basis of various criteria and parameters such as radial, axial and tangential moment weights or acoustic properties, from a list of produced and measured parts not yet associated with a disc. The vanes are therefore not reworked after measuring their radial moment weights, and balancing is carried out on the basis of an optimum distribution determined by calculation. This method has its disadvantages. It was found that, given the dispersion of the radial moment weight of the vanes, the fan is not perfectly balanced despite the optimised distribution of the vanes on the disc. As a result, today, to compensate for this dispersion, it is necessary to add balancing weights, such as rivets, retrospectively to the cone of the fan module when the fan is fitted to the turbomachine. This solution allows to adjust the radial moment weight for the entire assembly of vanes of the fan, but there is currently no solution for adjusting this parameter for each individual vane.

There is therefore a strong interest in reducing the dispersion of the radial moment weight for the assembly the vanes.

On average, it is realised empirically that in order to improve the radial moment weight capability of the assembly of the vanes, it would be necessary to be able to benefit from a margin of 15 g in total on the mass of each of the vanes.

PURPOSE OF THE INVENTION

One of the aims of the present invention is to improve the balancing and the service life of a turbomachine fan by allowing both an adjustment of the mass of each vane of the fan and an improvement in the radial moment weight capability of the assembly of the vanes.

DESCRIPTION OF THE INVENTION

This objective is achieved, in accordance with the invention, by a method for manufacturing a fan vane for an aircraft turbomachine extending about a longitudinal axis, the vane comprising a blade made of a composite material having a leading edge and a trailing edge connected by a pressure side and a suction side, the blade extending between a root and a free end. According to the invention, the method comprises each of the following steps:
  pairing and bonding a metal shield to the leading edge,
  obtaining a first measurement of a radial moment weight of the vane before or after bonding the metal shield and determining a machining kerf,
  machining the free end and/or trailing edge along the machining kerf so as to adjust the mass and the radial moment weight of the vane,
  obtaining a second measurement of the radial moment weight of the vane.

The steps of pairing and bonding the metal shield, machining and obtaining the second measurement of the radial moment weight of the vane are carried out chronologically in the order in which they are stated. Advantageously, the steps of pairing and bonding the metal shield, obtaining the first measurement of the radial moment weight of the vane and determining a machining kerf, machining and obtaining the second measurement of the radial moment weight of the vane are carried out chronologically in the order in which they are stated.

This solution therefore allows to achieve the above-mentioned objective. In particular, the radial moment weights of the vanes are prevented from being scattered by means of an anticipatory solution. Both the mass of each vane and its radial moment weight are adjusted at the end of the manufacturing range. This allows to achieve a better radial moment weight capability, i.e. an adjustment of the radial moment weight of each vane in relation to that of the other vanes. This allows the fan to be re-centred around the longitudinal axis. Once the radial moment weight of the vanes has been adjusted, the subsequent step of balancing the fan using the centrifugal weights can be dispensed with. The fan balancing is optimised and its service life is improved.

The method according to the invention may comprise one or more of the following characteristics, taken in isolation from one another or in combination with one another:
 the machining kerf is determined by estimating a target radial moment weight after machining, from the first measurement of the radial moment weight;
 the machining kerf delimits a sacrificial mass of between 5 g and 20 g, preferably 10 g;
 the machining kerf is determined as a function of a predefined tolerance for the dimension of the vane;
 the dimensions apply to the length of the chord of the vane;
 the dimensions apply to the mass of the vane;
 the length of the chord of the vane can be reduced by between 3 mm and 4 mm.

The invention also relates to a method for assembling an aircraft turbomachine fan comprising a step of mounting vanes on a central disc, each vane being manufactured according to the above method.

BRIEF DESCRIPTION OF THE FIGURES

The invention will be better understood, and other purposes, details, characteristics and advantages thereof will become clearer on reading the following detailed explanatory description of embodiments of the invention given by way of purely illustrative and non-limiting examples, with reference to the appended schematic drawings. On these drawings.

DESCRIPTION OF EMBODIMENTS OF THE INVENTION

Figure 1:
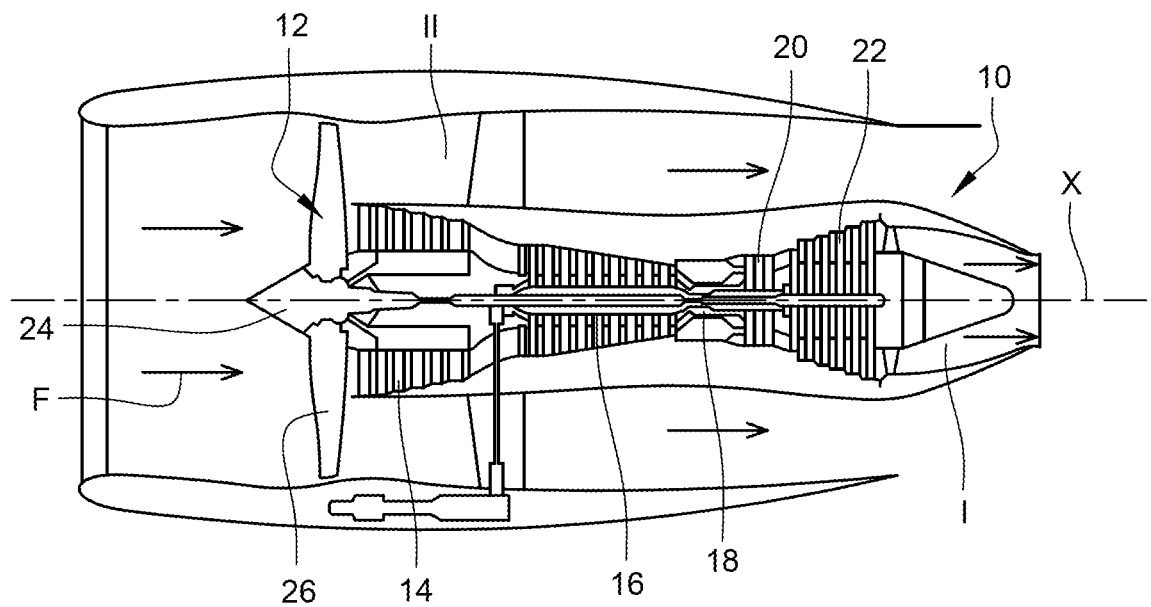
FIG. 1 is a schematic longitudinal cross-section of a double flow turbomachine.
Figure 2:
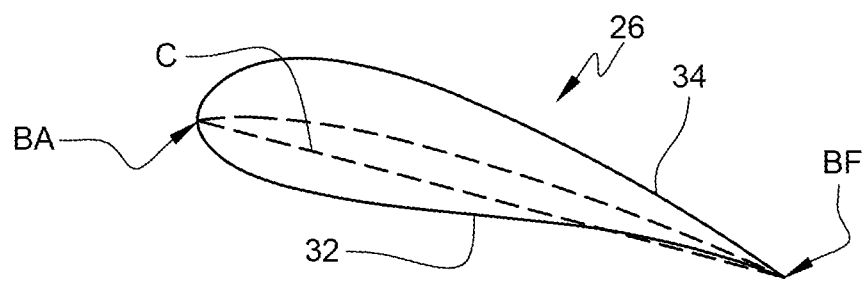
FIG. 2 is a schematic cross-sectional view of a fan vane.

FIG. 1 shows an aircraft turbomachine 10, in this case a turbofan engine with double flow and double body. The turbomachine 10 extends around a longitudinal axis X. The gas flow F flows substantially parallel to the longitudinal axis X. In known manner, the turbomachine 10 comprises, from upstream to downstream in the orientation of flow of the gas flows F, a fan 12, a low-pressure compressor 14, a high-pressure compressor 16, an annular combustion chamber 18, a high-pressure turbine 20 and a low-pressure turbine 22.

The rotors of the high-pressure compressor 16 and of the high-pressure turbine 20 are connected by a high-pressure (HP) shaft and together form a high-pressure body. The rotors of the low-pressure compressor 14 and the low-pressure turbine 22 are connected by a low-pressure (LP) shaft and together form a low-pressure body. The HP and LP shafts extend along the longitudinal axis X.

The turbomachine 10 also comprises a fan casing which extends around it and which defines an air inlet duct for the flows F. A portion of this air enters an internal annular flow duct I for a primary flow and the other portion feeds an external annular flow duct II for a secondary flow. The duct I passes through the high-pressure and low-pressure bodies and the combustion chamber 18. The external duct II surrounds the casings of the compressors and of the turbines and joins the internal duct I in a nozzle (not shown) of the turbomachine 10.

The fan 12 comprises a central disc 24 (also referred to as a hub) and an annular row of vanes 26 carried by said central disc 24. For example, the central disc 24 is centred on the longitudinal axis X. The central disc 24 is movable in rotation about the longitudinal axis X. The central disc 24 is connected to a fan shaft. The fan shaft, for example, is secured in rotation to the low-pressure shaft. For example, the fan shaft is connected to the low-pressure shaft by means of a speed reduction gear (not shown). In this way, the fan 12, particularly when it is very large, is driven at a lower speed of rotation than the LP shaft, in order to adapt it better to the flight conditions of the aircraft.

Figure 3:
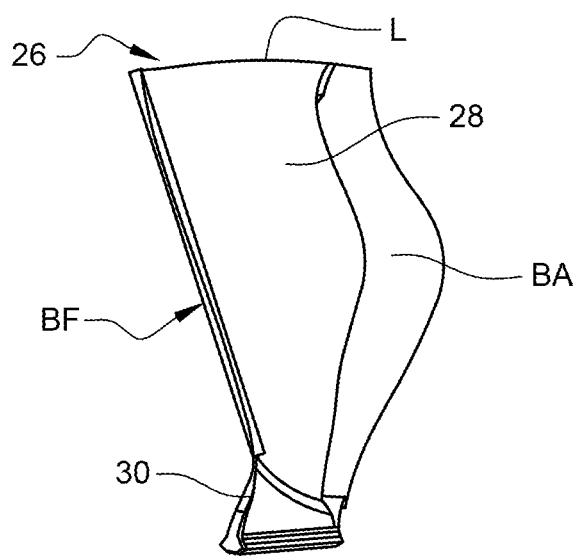
FIG. 3 is a perspective view of a fan vane.

As can be seen in FIG. 3, the vane 26 comprises a blade 28 extending between a free end L and a root 30 of the vane 26. This root 30 is intended to be fitted into a corresponding slot (not shown) in the central disc 24 of the fan 12. When the vane 26 is fitted onto the disc 24, the blade 28 therefore extends radially with respect to the longitudinal axis X, between the free end L and the root 30. This fitting takes place using a mechanism that is well known in the prior art.

The blade 28 has a leading edge, a trailing edge BF, a pressure side 32 and a suction side 34. The pressure side 32 and the suction side 34 connect the leading edge to the trailing edge BF. The blade 28 also has a chord C in profile. The chord C connects the leading edge to the trailing edge BF. The blade 28 is made of composite material. The composite material is, for example, an organic matrix composite material. The composite material comprises, for example, a polymer matrix and fibres embedded in the matrix.

The vane 26 also comprises a metal shield BA arranged on the leading edge. The metal shield BA is made of titanium, for example. For example, it has a dihedral shape. It extends between the root 30 and the free end L of the vane 26. The shield comprises a first lateral wing extending in part over the pressure side 32 and a second lateral wing extending in part over the suction side 34. Advantageously, and according to the aerodynamic design of the vane 26, the distance from the leading edge to the trailing edge BF is greater on the suction side 34 than on the pressure side 32. The gas flows F passing along the suction side 34 have a greater distance to cover than those passing along the pressure side 32, and have a comparatively a greater flow velocity. Thus, on the suction side 34, the gases exert a lower pressure on the vane 26 than that exerted on the pressure side 32.

The vane 26 has its own centre of gravity and therefore its own radial moment weight (RMW). This radial moment weight is adjusted according to the invention both by modifying the mass and the shape of the vane 26.

The vane 26 can be machined before fitting into the central disc 24. The metallic part cannot easily be modified after pairing.

In order to optimise the balancing of the fan 12, it is desirable to homogenise the radial moment weight of each vane 26 as much as possible. According to the present invention, this homogenisation is carried out in the factory, during the manufacturing method for manufacturing the vane 26. The radial moment weight of the vane 26 is homogenised after the metal shield BA has been paired and bonded to each of the vanes 26. The manufacturing method according to the invention thus comprises four steps carried out chronologically in the order in which they are described, unless otherwise stated for one or more steps:

pairing and bonding the metal shield BA to the vane 26, obtaining a first measurement of the radial moment weight of the vane 26 to obtain an actual radial moment weight and determining a machining kerf, machining the free end L and the trailing edge BF of each vane along the specified kerf, obtaining a second radial moment weight measurement.

Obtaining the first measurement is performed before or after the metal shield BA is paired and bonded.

Machining is carried out in such a way as to adjust the mass and the radial moment weight of each vane 26 to a target radial moment weight, thereby allowing to optimise the centring of the fan 12 on the turbomachine 10.

The target radial moment weight is determined empirically at the factory. The target radial moment weight is located between a minimum value and a maximum value determined by a person skilled in the art when designing the vane 26. Once the target radial moment weight has been determined, it can be compared with the actual radial moment weight of the vane 26 determined during the obtention of the first measurement and the machining kerf can be determined. The sacrificial mass to be removed can then be calculated. More specifically, the machining kerf is determined, for each vane 26, by combining the first measurement of the radial moment weight and abacus tables. For example, abacus tables are automated in the form of an algorithm that takes the first measurement of the radial moment weight as input data. Advantageously, the algorithm is fed by the mass values of the vanes and by the results of machining cuts on previous vanes.

The machining kerf is therefore obtained by determining both the sacrificial mass to be removed and the location from which it is to be removed. This sacrificial mass (delimited by the machining kerf) is between 5 g and 20 g, preferably 10 g.

The machining and the radial moment weight are used in two alternative ways in the method of the present invention:

or the radial moment weight of the vane 26 is measured before the metal shield BA is bonded, then the metal shield BA is bonded and the mass in excess of the target radial moment weight is removed, or the radial moment weight is measured after the metal shield BA has been bonded and the sacrificial mass removed.

The proposed solution therefore consists of machining the trailing edge BF and/or the free end L after the metal shield BA has been paired and bonded. The composite material is then machined. However, it is not always possible to follow the kerf exactly: even after machining, the vane 26 must be sized in accordance with pre-established standards and specifications. These dimensions apply to the length of the chord C of each vane 26 and/or to its mass.

The vane 26 can be machined with a greater or lesser offset upstream or downstream of the kerf, so as to ensure a chord length C and a radial moment weight within the defined dimensioning tolerances while respecting the tolerance margin for the radial moment weight. The radial moment weights of the vanes 26 need to be homogenised without compromising the quality of the fan 12. If, despite this margin of tolerance, the sacrificial mass to be removed is too great and the dimensions of the post-machining vane 26 no longer comply with the defined dimensioning tolerances, this vane 26 is scrapped.

For example, on the turbomachine LEAP-1A, it is possible to calculate the sacrificial mass that can be machined to obtain the target radial moment weight, while remaining within the dimensioning tolerances and the tolerance margin of the radial moment weight.

In this example, the calculated trailing edge area is 1994 mm$^2$. The dimensioning tolerances on the chord line C are between 3 mm and 4 mm. In this way, 3 mm to 4 mm can be machined while allowing the vane 26 to remain within the previously defined dimensioning tolerances.

The sacrificial mass available on the trailing edge BF can thus be deduced. As a reminder, the density of a composite material is typically 0.00155 g/mm3. With a trailing edge BF margin of between 3 mm and 4 mm, the mass that can be machined (or retained) is estimated at around ten grams.

It has been determined empirically by the Applicant that about ten grams represents a significant target mass with respect to the radial moment weight.

The larger the size of a composite vane 26, or the greater the tolerances on the chord length C, the greater the sacrificial mass can be, as it allows the radial moment weight to be modified over a wider range and allows a target radial moment weight to be obtained during production.

The present invention therefore allows to correct the mass of the vane 26 so that, after machining, it lies within the defined radial moment weight tolerance margin. This optimises the production capability of this parameter.

In addition, the costs incurred by non-conformities (exemption treatment, any rework) are limited.

In addition, by considering the ageing of the vanes 26 in a turbomachine 10 in operation, under conditions of use similar to the turbomachines equipped with fans 12 with paired vanes 26 according to the prior art, the fall in radial moment weight linked to the ageing of the vanes 26 of the turbomachine 10 is better anticipated.

Finally, by anticipating the contributions of the protective layers on the composite and of the paint on the final radial moment weight of the vane 26, adaptive machining allows to obtain an actual radial moment weight that is substantially similar (within the defined radial moment weight tolerance margin) to the target radial moment weight.

The invention claimed is:

1. A method for manufacturing a vane for a fan of an aircraft turbomachine extending about a longitudinal axis, the vane comprising a blade made of a composite material having a leading edge and a trailing edge connected by a pressure side and a suction side, the blade extending between a root and a free end, the method comprising each of the following steps:

pairing and bonding a metal shield to the leading edge, obtaining a first measurement of a radial moment weight of the vane before or after bonding the metal shield and determining a machining kerf, machining the free end and/or the trailing edge along the machining kerf so as to adjust the mass and the radial moment weight of the vane, obtaining a second measurement of the radial moment weight of the vane.

2. The method according to claim 1, wherein the machining kerf is determined by estimating a target radial moment weight after machining, from the first measurement of the radial moment weight.

3. The method according to claim 1, wherein the machining kerf delimits a sacrificial mass of between 5 g and 20 g.

4. The method according to claim 1, wherein the machining kerf delimits a sacrificial mass of 10 g.

5. The method according to claim 1, wherein the machining kerf is determined as a function of a predefined tolerance of the dimensions of the vane.

6. The method according to claim 5, wherein the dimensions apply to the length of the chord of the vane.

7. The method according to claim 6, wherein the length of the chord of the vane can be reduced by a length of between 3 mm and 4 mm.

8. The method according to claim 5, wherein the dimensions apply to the mass of the vane.

9. A method for assembling the fan for the aircraft turbomachine, comprising a step of mounting vanes on a central disc, each vane being manufactured by the method of claim 1.

* * * * *